G. P. MILLER.
BOTTLE CORKING MACHINE
APPLICATION FILED FEB. 18, 1915.

1,209,192.

Patented Dec. 19, 1916.
6 SHEETS—SHEET 1.

Witnesses
C. M. Walker
Amy W. Little

Inventor
George P. Miller
By
Attorney

UNITED STATES PATENT OFFICE.

GEORGE P. MILLER, OF GOVANS, MARYLAND.

BOTTLE-CORKING MACHINE.

1,209,192.     Specification of Letters Patent.     Patented Dec. 19, 1916.

Application filed February 18, 1915. Serial No. 9,162.

*To all whom it may concern:*

Be it known that I, GEORGE P. MILLER, a citizen of the United States, residing at Govans, near Baltimore, and State of Maryland, have invented certain new and useful Improvements in Bottle-Corking Machines, of which the following is a specification.

This invention relates to bottle corking machines.

One object is to provide a bottle corking machine embodying a support for the bottles and means to select substantially perfect corks and position them properly for insertion in the bottles.

Another object is to provide a machine for corking bottles wherein the corks are taken from a batch and fed in single series into a chute from which they are taken one at a time and seated in pockets of a rotatable carrier, from which they are taken and inserted one at a time in the neck of a bottle.

Another object is to provide a bottle corking machine embodying a hopper to contain a batch of small tapered corks from which the corks are carried through conveying means designed to carry the corks with their smaller ends downward to a corking mechanism in position for insertion into the bottles to cork the latter, with means arranged in the path of travel of the corks from the hopper to the corking mechanism to right upside down or tilting corks, in combination with means to eject any corks not positioned with their smaller ends downward and substitute for the ejected corks other corks properly positioned, so that as the corks are presented to the corking mechanism, the corking operation may be effectually performed.

Another object resides in the provision of a bottle corking mechanism embodying a corking mechanism involving centering means for the bottles and the corks fed to the corking mechanism, in combination with means to effect discharge of improperly positioned or defective corks and substitute others therefor prior to the corks reaching the corking mechanism.

Another object resides in the provision of a bottle corking machine, embodying means to contain a batch of small tapered corks; a chute; means operable intermittently to carry a number of corks from the containing means to said chute; a rotatable carrier provided with cork receiving pockets; means to convey corks with their smaller ends downward into a feed tube whose lower end is disposed in the path of travel of the pockets in the rotatable carrier; means operable to effect discharge of one cork at a time into each pocket as the pockets pass under the feed tube; means to eject defective or upside down corks from the pockets, one at a time; an auxiliary cork feeding means to supply corks to pockets from which corks have been ejected; rotatable means to transfer the corks from the rotatable carrier into position over the bottles; means to feed the bottles into corking position; means for centering the bottles with relation to the corks to be inserted therein; means to center the transferring means with relation to the rotatable carrier pockets and the bottles; means whereby the extreme lower ends of the corks may be subjected to a bath to moisten and soften the lower ends only thereof prior to positioning the corks over the bottles; and means to simultaneously transfer a cork from the rotatable means to the rotatable transferring means and remove a cork from the same and force it into the bottle centered therebeneath, the centering means then releasing the bottle and the bottle feeding means then operating to take the corked bottle away from the bottle centering means and presenting another bottle to the centering means to receive a cork.

A still further object is to provide a plurality of intermittently operating connected mechanisms for selecting and positioning small tapering corks for insertion into bottles fed intermittently into corking position.

It is still further designed to provide a bottle corking machine particularly adapted for the handling of small tapered corks for sealing small bottles and embodying, among this and other characteristics, means whereby while certain bottles are being filled with liquid, other bottles, which have been filled, are being corked.

With these and other objects in view the invention consists in the construction and novel combination of parts hereinafter fully described, illustrated in the accompanying drawings, and pointed out in the claims appended hereto, it being understood that various changes in the form, proportion, size and minor details of construction, within the scope of the claims, may be resorted to without departing from the spirit or sacrificing any of the advantages of the invention.

Figure 1:
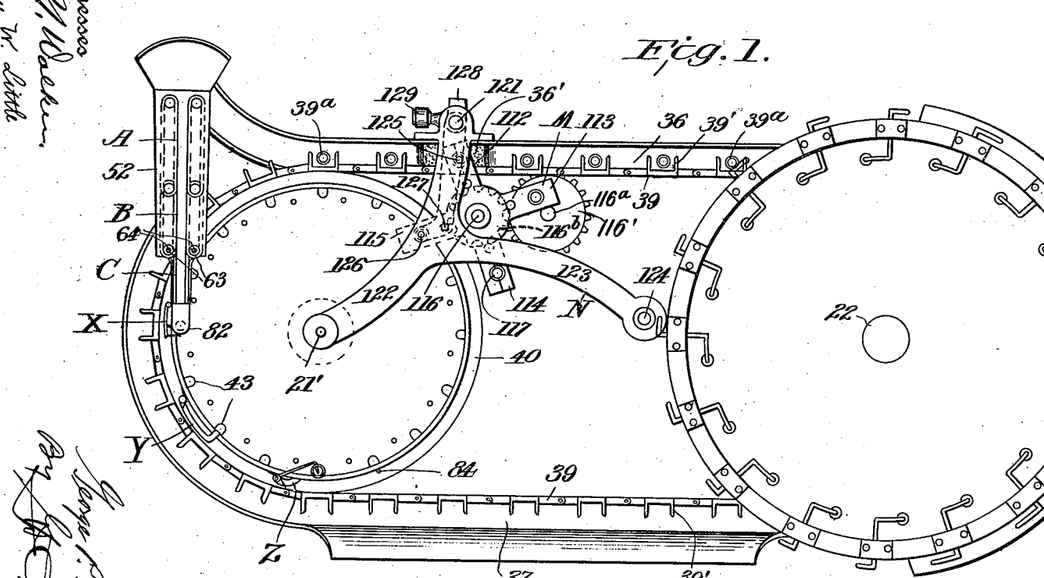
Figure 1 is a plan view.
Figure 2:
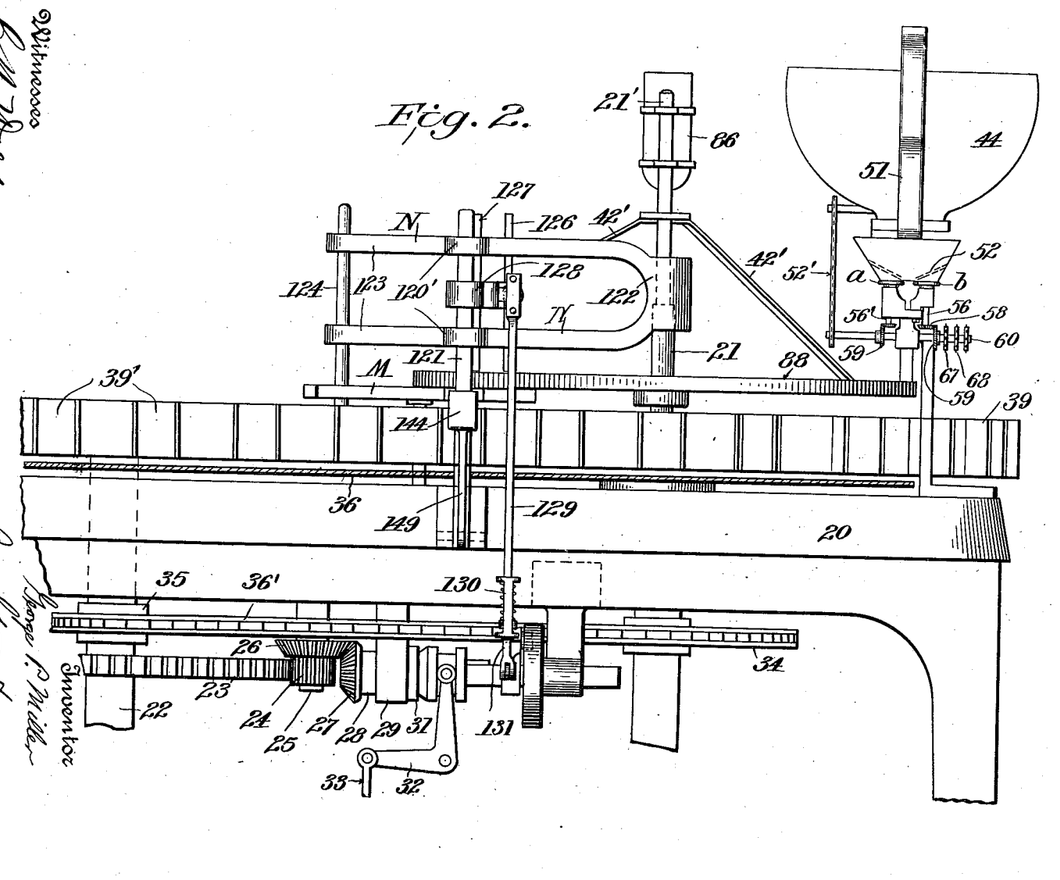
Fig. 2 is a side elevation.
Figure 3:
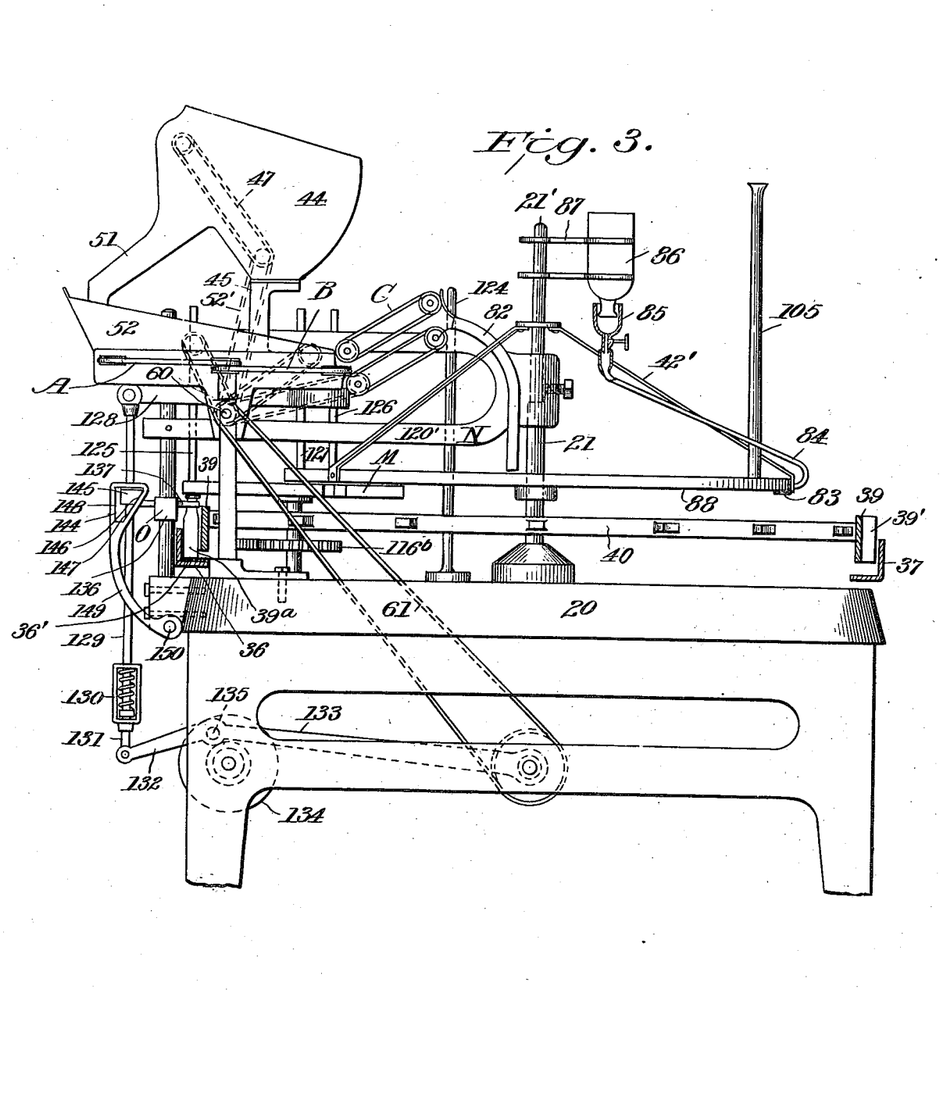
Fig. 3 is an end view.
Figures 4, 11:
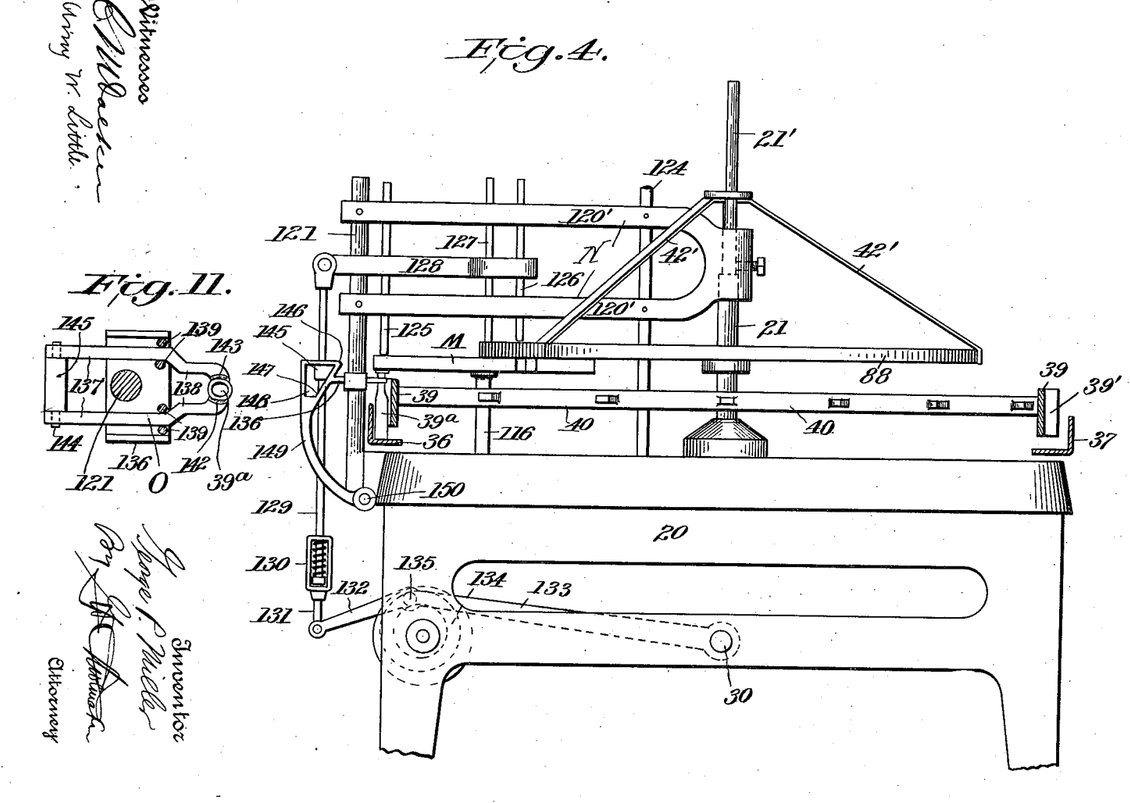
Fig. 4 is an elevation with the cork and cork feeding mechanism removed.
Fig. 11 is a top plan view of the bottle centering means.
Figures 5, 6:
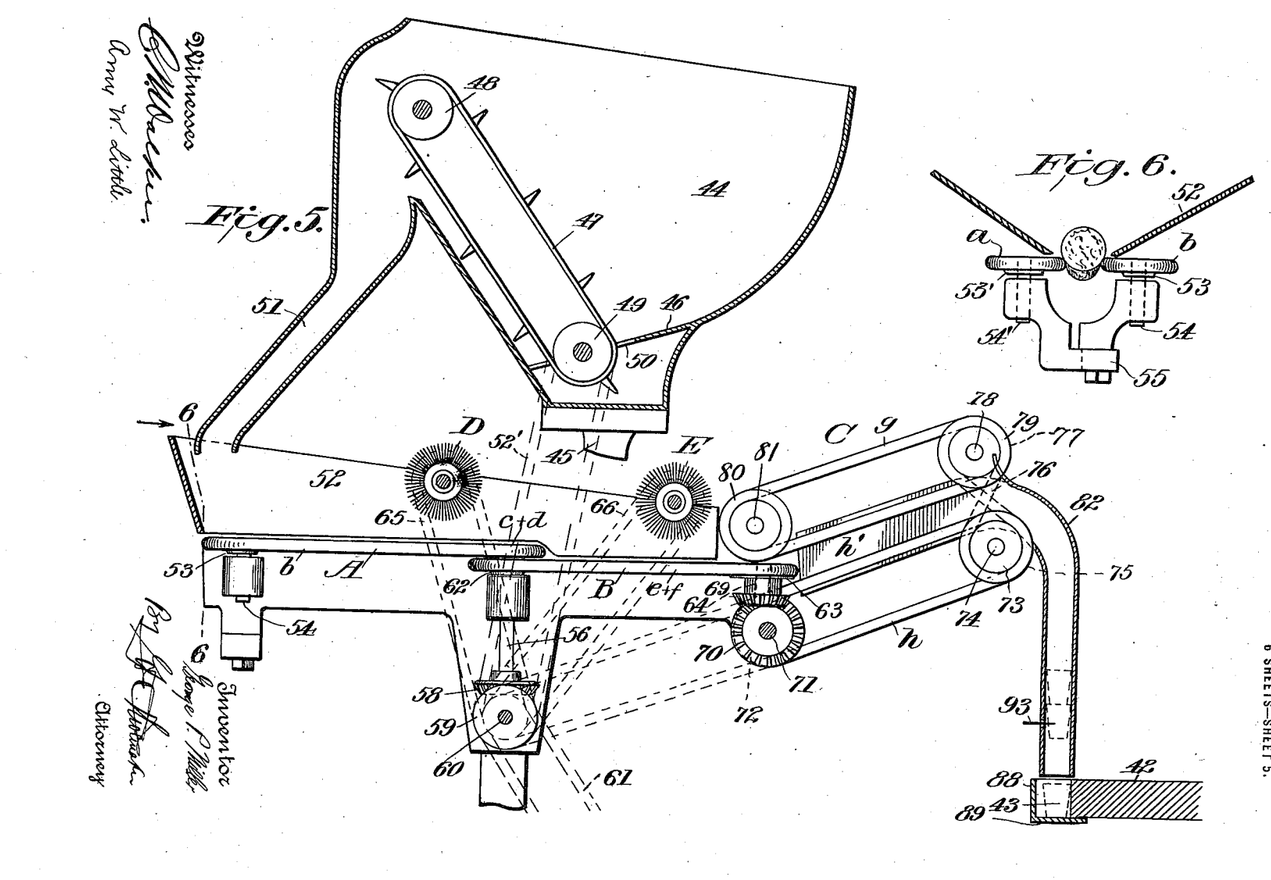
Fig. 5 is an enlarged detail view of the main feeding mechanism.
Fig. 6 is a cross sectional view on the line 6—6 of Fig. 5.
Figures 7, 8, 10:
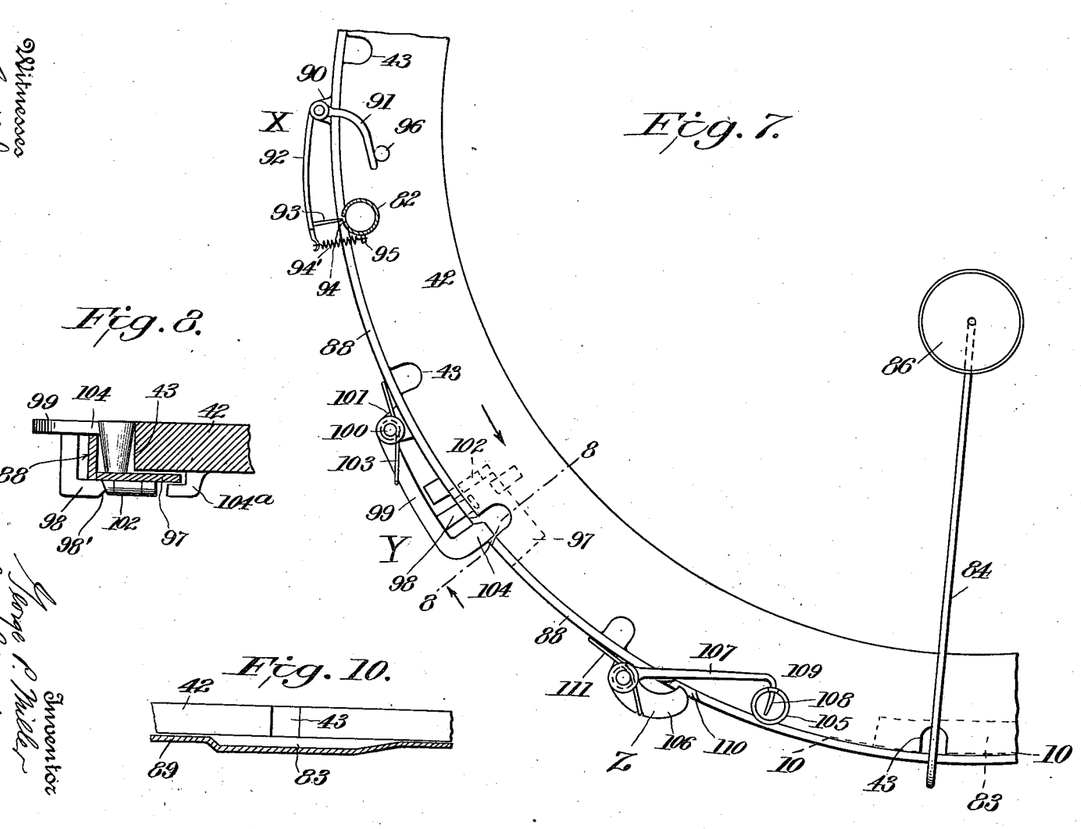
Fig. 7 is a detail plan view of part of the cork carrying disk.
Fig. 8 is a sectional view on the line 8—8 of Fig. 7.
Fig. 10 is a fragmentary sectional view through the rotatable cork carrier and the bath chamber.
Figure 9:
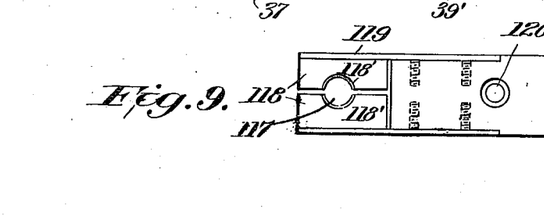
Fig. 9 is a detail view of the transferring device.

Referring now more particularly to the accompanying drawings, my improved corking machine is preferably coupled up with a machine for filling and labeling bottles, but the filling and labeling mechanisms are embodied in separate applications, and only so much of the filling mechanism as is necessary to make clear the operation of the present invention in connection therewith is illustrated in the present case.

To the above end there is shown a frame 20 of any suitable construction and material in which vertical shafts 21 and 22 are journaled. The shaft 22 may be provided with a gear 23, adapted to mesh with a pinion 24 carried by a stub shaft 25. On this stub shaft 25 is a beveled gear 26 adapted to mesh with a beveled gear 27, keyed to a short driven shaft 28 journaled in a suitable supporting means 29. This driven shaft 28 may be driven by the main drive shaft 30 of the machine, which is provided with a clutch mechanism 31 to connect it up with the driven shaft 28. Any suitable means may be provided to shift the clutch mechanism 31, there being shown a bell crank lever 32 operated by a foot or other connection 33.

On the shaft 21 is a sprocket 34 which has connection with a sprocket 35 on the vertical shaft 22 by means of a drive chain 36', whereby upon operation of the main shaft 30 and a positive connection therebetween and the driven shaft 22, both shafts 21 and 22 are rotated.

On the framework 20 on opposite sides thereof are spaced shelves 36 and 37, over which travel a feeding means consisting preferably of an endless chain or the like 39 to which may be detachably secured pockets 39' which are preferably open at their outer sides and at their upper and lower ends and which are adapted to receive the bottles 39ª.

The operator of the machine places the bottles in the pockets 39' at that side of the machine on which the shelf 37 is located and the feeding means 38 being connected to suitable sprockets 40 and 41 on the shafts 21 and 22, the feeding means is caused to travel to carry the bottles thus placed in the pockets along said shelf and around the sprocket 41 onto the shelf 36. As the bottles are transferred from the shelf 37 onto the shelf 36 around the sprocket 41, they are supported and filled with liquid in any suitable manner, preferably after the manner disclosed in my Patent No. 1,159,598, dated Nov. 9, 1915. In view of the prior disclosure, it is deemed unnecessary to illustrate the filling means in this case. Suffice it to state that the feeding means 39 is fed intermittently and that when the bottles are being filled, the feeding means is at rest and while the feeding means is at rest for filling purposes, a plurality of bottles may be labeled or corked or both labeled and corked. In any event, in the present application, while the feeding means is at rest and certain bottles are being filled, other bottles which have been filled and carried along the shelf 36 onto the cushion 36' are being corked. An intermittently rotatable cork carrying disk 42 is keyed on the aforesaid vertical shaft 21 above the sprocket 40, and in its edge it is provided with a plurality of equidistant cork receiving pockets 43 which are preferably substantially U-shaped, and which open out through the periphery of the rotatable disk.

A hopper 44 is mounted on a support 45 secured in any suitable manner to the framework of the machine. The hopper has an inclined bottom 46 and an elevating endless toothed or other suitable belt 47, journaled on rollers 48 and 49, the latter being preferably journaled through an opening 50 formed in the inclined bottom 46.

The cork elevating device 47 is preferably disposed upon an incline with the bottom 46 inclined for the purpose of feeding the corks toward the elevating device 47, so that in the operation of the latter the corks may be readily elevated toward the top of the hopper and discharged therefrom over the roller 48 and into the chute 51. The upper portion of the chute 51 is relatively large, and the lower portion is preferably of a size suitable to permit passage of a single series of corks at a time through the same. The elevating device 47 may be driven in any suitable manner, but preferably by a connection 52' with the shaft 60, so as to operate the elevating device 47 intermittently in timed relation to the intermittent feed of the bottle feeding means. The corks are delivered to the rotatable disk 42 from the hopper 44 by a combined feeding and cork righting means, whose construction may be varied and which is shown as consisting of a plurality of sets of belts A, B, and C and brushes D and E, which feed the corks and right them on their way from the chute 51 of the hopper 44 to the carrier disk 42. The first set of belts A is arranged to receive the corks from the chute 51 of the hopper 44, there being a trough 52 arranged to direct the corks in between the belts $a$ and $b$ constituting the set of belts A. The belts $a$ and $b$ are adapted to pass around sheaves 53 and 53' secured to the respective stub shafts 54 and 54', journaled in a bracket 55 secured to the framework of the machine. They are adapted to also pass around sprocket wheels $c$ and $d$ mounted on stud shafts 56 and 56' journaled in the part 57 of the framework. These shafts 56 and 56' are driven by beveled gears 58 at their lower ends in mesh with beveled gears 59 secured to the shaft 60. The shaft 60 is driven through the instrumentality of a suitable chain connection 61 with the main drive shaft of the machine.

One of the gears 58 is preferably larger than the other gear 58, so that the belt $a$ is driven faster than the belt $b$. On the shafts 56 and 56' sheaves 62 and 62' are arranged preferably beneath said sprocket wheels $c$ and $d$, and these sheaves 62 and 62' are adapted to receive the belts $e$ and $f$ of the set of belts B, which belts also pass around sheaves 63 secured to suitable shafts 64 mounted in the framework of the machine, whereby through the instrumentality of the driving connection 61 between the main drive shaft and the shaft 60 both sets of belts A and B are driven. The set of belts B is adapted to travel faster than the speed of the faster one of the belts comprised in the set of belts A, and the set of belts B is adapted to take the corks with their minor ends downward from the set of belts A.

The brushes D and E are driven through the instrumentality of suitable belts 65 and 66 respectively, connected to sprockets 67 and 68 on the shaft 60. The brush D is adapted to coöperate with the set of belts A to prevent bunching of the corks and to insure feeding of the corks with their minor ends downward toward the belt B. The brush E is adapted to right any corks that may become inverted and to assure the corks passing on an upward inclined plane in between the belts $g$ and $h$, constituting the set of belts C. The belts $g$ and $h$ are driven by virtue of a beveled gear 69 secured to one of the aforesaid shafts and meshing with a beveled gear 70 on the shaft 71, on which the sheave 72 of the belt $h$ is mounted at one end. The opposite end of the belt $h$ operates over a pulley 73, mounted on a shaft 74, on which may be secured a sheave 75 to accommodate a crossed belt connection 76 leading therefrom to a pulley 77 on the shaft 78 on which the pulleys 79 of the belts $g$ are mounted, and through which the belts $g$ are driven over the pulleys 80 on their axis 81. The set of belts C travels faster than the set of belts B and the lower belts $h$ of the set C, being spaced, to provide a groove or way $h'$ to cause the corks to be fed in a straight line in single series to the feed tube 82.

The belts $g$ and $h$ of the set C are preferably arranged in alinement with the space between the belts of the set B, with the space between the belts of the set B leading directly into the space between the belts $g$ and $h$ of the set C, so that the corks may be taken in single series directly from the set of belts B up through the space between the belts $g$ and $h$ of the set C with the corks disposed on an upward incline, as shown.

As before stated, the corks are delivered from the set of belts C into the upper end of the feed tube 82, through which the corks pass in single series with their minor ends downward, as shown. This feed tube 82 leads directly to the rotatable disk 42 so as to deliver one cork at a time into the respective pockets 43 of the said carrier disk. Surrounding the cork carrier 42 close to the peripheral edge thereof is a fixed ring 88, provided with an inwardly directed annular flange 89 which lies close to the bottom of the feed disk 42. Braces 42' may connect the ring 88 to the standard 21'. On this ring 88, adjacent the tube 82, and pivotally mounted in a suitable bracket 90, is a cork discharging device X, which is designed to normally close the lower end of the feed tube 82 to prevent the supply of more than one cork at a time to the disk carrier 42. This cork discharging device X is provided with a trip arm 91, and a spring controlled arm 92. The arm 92 carries a needle 93 adapted to project through an opening 94 in the lower end of the feed tube 82, and into the lowermost cork to hold the corks in the feed tube 82 against accidental discharge therefrom. The needle 93 is held in this position by means of a spring 94', connected to the outer end of the arm 92 and to a projection 95 on the feed tube. As the disk 42 is rotated step by step a projection 96 arranged slightly in advance of each pocket 43 engages the trip arm 91 of the device X and causes the needle 93 on the arm 92 to be withdrawn from the feed tube 82 out of the lowermost cork, against the action of said spring 94', so that a cork may be discharged from the tube 82 onto the disk 42, slightly in advance of the respective pocket 43. When the adjacent pocket reaches the feed tube 82 the disk has come to rest with the result that the released cork drops into the pocket.

Immediately upon release of the cork and before it is deposited in the respective pocket the projection 96 has passed the trip arm 91 with the result that the spring 94' causes the needle 93 to enter the feed tube and pierce the next above cork, which has lowered in the tube 82 and was supported on the released cork, and hold the same until released in the manner just stated. Thus, if a cork is fed with its minor end downward it is properly seated in the respective pocket 43 of the carrying disk 42. If, by chance, although it is not likely, a cork is discharged from the feed tube 82 and enters the respective pocket 43 with its larger or major end downward, it is desired that such cork be ejected from the pocket. It is desired also to eject corks mutilated or imperfect to such extent as to not be effective for sealing the bottles. For this purpose I provide an ejector device Y. This ejector device may consist of a trip arm 99 and a hinged door 97 formed in the inwardly directed annular flange 89 held normally closed by the lug 98 of the trip arm 99. This trip arm is pivoted at 100 in a bracket 101 on the aforesaid ring 88. The lug 98 is held normally under the door 97 and the projection 104 is held normally in alinement with the slot in the ring 88 and does not enter the pockets of the disk, because of the major ends of the corks practically completely filling the pockets, when the corks are in proper position in the pockets. If a cork be upside down the upper side of the pocket is not completely filled by the minor end of the cork, nor is the pocket completely filled by a broken or imperfect cork, with the result that the arm 99 moves inwardly, carrying its projection 104 into the pocket. This inward movement of the arm 99 causes the lug 98 to swing away from the underside of the door 97 with the result that the latter swings on its hinge 102, dropping the cork.

The door 97 is automatically returned to its closing position with relation to the flange 89 by means of a projection 104ᵃ carried by the disk on the underside of the latter. When the projection 104ᵃ of the disk comes in contact with the downwardly swung door 97, it causes it to swing upwardly and over the beveled edge 98′ of the lug 98 when the door is held in closed position, until again tripped to effect ejection of an improperly seated or mutilated cork. Now that the upside down cork has been ejected from the respective pocket, or in the event that no cork has been supplied to a pocket by the main feed, the rotation of the disk is carrying this empty pocket toward the corking device, and in order that an empty pocket or the pocket from which the cork has been ejected may be supplied with a cork prior to such pocket reaching the corking device, I provide an auxiliary cork feeding means which consists preferably of a tube 105 supported in any suitable manner on the framework of the machine and with respect to the pockets 43 of the disk 42. The corks are arranged with their minor ends downward in a single series in this auxiliary feed tube 105 and are held against accidental discharge therefrom by a controlling device Z. This controlling device Z consists of a double armed lever including a trip 106 and an arm 107 provided with a cork retaining needle 108 which projects through an opening 109 in the auxiliary feed tube 105 and into the lowermost cork, arresting accidental feeding of the corks out of the tube 105. The trip arm 106 is preferably curved and lies normally adjacent an opening 110 in the ring 88, so that when the empty pocket is brought into alinement with the inner end of the curved trip arm 106, the latter enters the empty pocket and consequently throws the needle 108 out of the auxiliary tube 105. Then, when the empty pocket reaches the auxiliary feeding tube 105, it takes a cork from the auxiliary tube 105. After release of the lowermost cork and prior to discharge of the released lowermost cork from the auxiliary feed tube, the needle 108 has been thrown into the auxiliary feed tube and has pierced the cork next above to stop further feed of corks until another empty pocket comes into coöperative relation with the controlling device Z. The corks are next carried by the carrier disk in the pockets through a bath chamber 83 to moisten and soften the lower ends only of the corks. The water for the bath chamber 83 may be supplied in any suitable manner, but as shown, it is fed through a pipe 84 from a valved receptacle 85 adapted to take the mouth of a water bottle or other reservoir 86 secured by brackets 97 on the standard 21′ disposed along the shaft 21.

To transfer the corks from the carrier 42 I provide a suitable device M in the form of a spider frame or star wheel, consisting of four equidistant arms 112, 113, 114 and 115. This frame M is keyed to a shaft 116 journaled in the framework, and it is rotated in timed relation to the bottle feeding means through the instrumentality of a sprocket wheel 116′ on the stub shaft 116ᵃ which meshes with the bottle feeding chain and between which stub shaft and the shaft 116 is a suitable gear connection 116ᵇ. The transferring device M throws its arms under the carrier 42. In each arm 112, 113, 114, and 115 is an expansible and contractible socket 117. To render these sockets 117 expansible and contractible, the same are each preferably formed by two spaced members 118, each provided with a substantially semi-circular recess 118′ and each carried by a yieldable strip of material 119. Adjacent each socket 117 of each of said arms is a centering perforation 120. Above the transferring device M is a yoke N including pairs of arms 120′ secured to a post 121, another pair of arms 122 secured to the aforesaid shaft 21', and another pair of brace arms 123 secured to a post 124.

Vertically slidable in the arms 120' of the yoke N are two plungers 125 and 126. A centering pin 127 is also vertically slidable in the arms 120' of the yoke N. The centering pin 127 has its lower end projecting normally lower than the lower ends of the plungers 125 and 126. These plungers and the centering pin are fixedly connected to a horizontal arm 128, which is slidable vertically between the arms 120' of the yoke N. This arm 128, and consequently the plungers and the centering pin, are raised and lowered together. Upon lowering the arm 128 and consequently lowering said plungers and said pin the plunger 126 will be in alinement with the socket 117 at the outer end of the arm 115, being centered with relation to said socket by means of the centering pin 127 engaging the centering pin orifice 120 in the arm 115. As this pin 127 centers the socket 117 with relation to the pocket in the carrier 42, it also effects a centering of the socket 117 of the arm 112 with relation to the respective bottle positioned on the cushion 36', which has been filled and which is ready to be corked, and into which bottle the cork is forced by the plunger 125 at the same time that a cork is forced by the plunger 126 out of the pocket of the carrier 42 into the respective socket 117 of the arm 115. To effect this simultaneous transfer of a cork from the carrier 42, and the sealing of a bottle by the insertion of a cork therein, I may provide any suitable means for lowering the plunger devices 125 and 126 and the centering pin 127. One way in which I accomplish this is to connect to the outer end of the arm 128 a rod 129, which has a cushioned connection 130 with a short rod 131 pivoted on the extension 132 of the arm 133 pivotally connected to the main driving shaft of the machine, there being a race way cam 134 to which said arm 133 is connected by means of a roller or other suitable connection 135, so that the plungers 125 and 126 and the centering pin 127 may be lowered to effect the aforesaid operations and raised for readiness to repeat said operations with respect to coöperative relation with other arms of the frame M and with relation to the intermittent feed of the bottles during the filling operation thereof.

I have described means for centering the transferring device with relation to the rotatable cork carrier and with relation to the bottles to be corked, and it will be noted that I provide means also to center each bottle to be corked. The centering of the bottle with relation to the transferring device is done just prior to the deliverance of a cork from the transferring device to the bottle, the operations being practically simultaneous, but as stated, the centering of the bottle taking place just prior to the insertion of the cork thereinto. To this end I provide a suitable gripping device O, which may be of any suitable construction, but which, as shown, for purposes of illustration, consists preferably of a slotted or grooved support 136 through which slides bottle gripping arms 137 provided with cam portions 138 adapted to ride between rollers 139 on the support 136. The support 136 is supported in any suitable manner, but preferably on the shaft 121. The inner ends of the gripping arms 137 are each preferably concave as indicated at 142, and rubber lined, as indicated at 143, the concave portions 142 being preferably such as to correspond to the curvature of the neck of the bottle. The outer ends of the gripping arms 137 are preferably connected together by means of a suitable connection 144, on which is loosely mounted a block 145 having an inclined edge 146 adapted to slide on the inclined side 147 of the opening 148, formed in a swinging arm 149 pivoted at 150 in any suitable manner to any suitable part of the framework. This arm 149 is swung on its pivot 150 by means of a suitable connection 151 with the aforesaid cam 134, and in such timed relation to the other working parts of the machine as to close the inner ends of the arms 137 about the neck of a bottle just prior to the insertion of a cork into the same from the transferring device M. This timed relation of the bottle centering means and the operation thereof is effected, as stated, through the instrumentality of a suitable connection 151 with the cam 134 to swing such swinging arm 149 outward, which causes the cam parts 138 of the arms 137 to ride on the rollers 139 and throw the inner ends of the arms 137 away from each other. On the opposite stroke or inward movement of the swinging arm 149 the inner ends of the gripping arms 137 are drawn along in gripping relation to the neck of the bottle, positively centering the same under the respective cork retaining aperture in the transferring device M in perfect alinement therewith to receive the cork. The sets of belts A, B, and C, as well as the trough which coöperates with the set of belts A, and other parts of the machine, are adjustably fitted together so that corks of various sizes may be fed through the machine, but detail description of these various elements is believed to be unnecessary.

What is claimed is:

1. In a bottle corking machine, means to support a bottle, a rotatable cork carrier provided with cork receiving pockets, means for delivering a cork to each pocket, means to transfer a cork from each pocket of the rotatable carrier to position it over the bottle, and means to eject the cork from the transferring means and force it into the bottle.

2. In a bottle corking machine, means to support a bottle, a rotatable carrier provided with cork receiving pockets, means for delivering corks to the pockets, a rotatable cork transferring device operable between said rotatable carrier and the bottle to be corked, and means for simultaneously delivering a cork to the rotatable transferring device from the rotatable carrier and ejecting a cork from the rotatable transferring device and forcing it into the bottle.

3. In a bottle corking machine, means to support a bottle, a rotatable carrier provided with cork receiving pockets, means for delivering corks to the pockets, and a rotatable transferring device to transfer a cork from one pocket of the rotatable carrier and position it over the bottle, and means to eject the cork from the rotatable transferring means and force it into the bottle.

4. In a bottle corking machine, means to support a bottle, a rotatable carrier provided with cork receiving pockets, means for delivering corks to the pockets, a rotatable transferring device to transfer a cork from the rotatable carrier and position it over the bottle, means for centering the cork with relation to the bottle, means for centering the bottle with relation to the cork, and means to eject the cork from the rotatable transferring device and force it into the bottle.

5. In a bottle corking machine, means to support a bottle, a rotatable carrier provided with cork receiving pockets, means for delivering corks to the pockets, a rotatable transferring device to transfer a cork from the rotatable carrier to position it over the bottle, means for centering the bottle with relation to the cork, and means to eject the cork from the rotatable transferring device and force it into the bottle.

6. In a bottle corking machine, means to support a bottle, a rotatable carrier provided with cork receiving pockets, means for delivering corks to the pockets, a rotatable transferring device to transfer a cork from the rotatable carrier and position it over the bottle, means for centering the cork with relation to the bottle, and means to eject the cork from the rotatable transferring device and force it into the bottle.

7. In a bottle corking machine, means to support a bottle, a rotatable carrier provided with cork receiving pockets, means for delivering corks to the pockets, means for moistening the lower ends of the corks while in their pockets, means to transfer a cork from one pocket of the rotatable carrier and position it over the bottle, and means to eject the cork from the transferring means and force it into the bottle.

8. In a bottle corking machine, means to support a bottle, a rotatable carrier provided with cork receiving pockets, means for delivering small tapered corks to each pocket with the minor ends of the corks downward, means to transfer a cork from one pocket of the rotatable carrier and position it over the bottle with its minor end downward, means to center the bottle and the cork with relation to each other, and means to eject the cork from the transferring means and force it into the bottle.

9. In a bottle corking machine, means to support a bottle, a rotatable carrier provided with cork receiving pockets, means for delivering corks to the pockets, an auxiliary cork feeding means to coöperate with the aforesaid cork delivering means to supply corks to pockets not supplied by the first-mentioned cork delivering means, means to transfer a cork from one pocket of the rotatable carrier and position it over the bottle, and means to eject the cork from the transferring means and force it into the bottle.

10. In a bottle corking machine, means to support a bottle, a rotatable carrier provided with cork receiving pockets, means for delivering corks to the pockets, means to eject corks from the pockets, means to supply corks to the pockets from which corks have been ejected, means to transfer a cork from one pocket of the rotatable carrier and position it over the bottle, and means to eject the cork from the transferring means and force it into the bottle.

11. In a bottle corking machine, means to support a bottle, a rotatable carrier provided with cork receiving pockets, means for delivering corks to the pockets, means to eject certain corks from the pockets, means to supply corks to the pockets from which certain corks have been ejected, means to moisten the lower ends of the corks while in their pockets, means to transfer one cork at a time from the rotatable carrier and position it over the bottle, means for centering the bottle and the cork thereover with relation to each other, and means to eject the cork from the transferring means and force it into the bottle.

12. In a bottle corking machine, means to support a bottle, a rotatable carrier provided with cork receiving pockets, means for delivering corks to the pockets, means to eject certain corks from the pockets, means to supply corks to the pockets from which certain corks have been ejected, means to moisten the lower ends of the corks while in their pockets, means to transfer one cork at a time from the rotatable carrier and position it over the bottle, and means to eject the cork from the transferring means and force it into the bottle.

13. In a bottle corking machine, means to support a bottle, a hopper, a rotatable carrier provided with cork receiving pockets, a cork feeding tube whose lower end is disposed in the path of movement of the pockets of the rotatable carrier, a combined feeding and righting means to feed and right the corks on their way from the hopper to the feed tube, means automatically operable to supply one cork at a time from the feed tube into successive pockets, means to transfer a cork from one pocket of the rotatable carrier and position it over the bottle, and means to eject the cork from the transferring means and force it into the bottle.

14. In a bottle corking machine, means to support a bottle, a hopper, a rotatable carrier provided with cork receiving pockets, a cork feeding tube whose lower end is disposed in the path of movement of the pockets of the rotatable carrier, a combined cork feeding and righting means to feed and right the corks on their way from the hopper to the feed tube, means automatically operable to supply one cork at a time from the feed tube into successive pockets, means to eject certain corks from the pockets, auxiliary means to supply other corks to the pockets from which corks have been ejected, means to transfer a cork from one pocket of the rotatable carrier and position it over the bottle, and means to eject the cork from the transferring means and force it into the bottle.

15. In a bottle corking machine, means to support a bottle, means for containing a batch of corks, a rotatable carrier, means including belts and a tube for feeding corks in single series to the rotatable carrier, means to effect the discharge of one cork at a time from the aforesaid feeding means onto the carrier, means to eject the corks one at a time from the rotatable carrier and position each cork thus taken over the bottle to be corked, and means to eject the cork from the means which takes the corks from the carrier and force the cork into the bottle.

16. In a bottle corking machine, means to support a bottle, a carrier to receive corks, means for delivering corks to said carrier, an auxiliary cork feeding means to coöperate with the aforesaid cork delivering means to supply corks to the carrier, means to transfer a cork from the carrier and position it over the bottle, and means to eject the cork from the transferring means and force it into the bottle.

17. In a bottle corking machine, means to support a bottle, means to contain a batch of small tapered corks, a rotatable carrier, means to feed the corks with their smaller ends downward to the rotatable carrier, means overlapping the carrier to transfer one cork at a time from the carrier to a position over the bottle, and means to simultaneously deliver a cork to said transferring means and eject a cork from the transferring means and force it into the bottle.

18. In a bottle corking machine, means to support a bottle, means to contain a batch of small tapered corks, a rotatable carrier, means to feed the corks with their smaller ends downward to the rotatable carrier, means overlapping the carrier to transfer one cork at a time from the carrier to a position over the bottle, means to eject the cork from said transferring means and force it into the bottle, and means for moistening the lower ends only of the corks during their travel on the carrier.

19. In a bottle corking machine, means to support a bottle, means to contain a batch of small tapered corks, a rotatable carrier, means to feed the corks with their smaller ends downward to the rotatable carrier, means overlapping the carrier to transfer one cork at a time from the carrier to a position over the bottle, means to simultaneously deliver a cork to said transferring means and eject a cork from the transferring means and force it into the bottle, and means for moistening the lower ends only of the corks during their travel on the carrier.

20. In a bottle corking machine, means to intermittently feed bottles to corking position, a rotatable carrier provided with cork receiving pockets, means to feed the carrier step by step, means to feed corks to the pockets, a corking device including a rotatable member, and means to effect simultaneous transfer of a cork to the rotatable member of the transferring means and also effect discharge of a cork therefrom and force it into a bottle temporarily at rest at corking position.

21. In a bottle corking machine, means to contain a batch of small tapered corks, a chute, means operable to carry a number of corks from the containing means to said chute, a rotatable carrier provided with cork receiving pockets, means to convey corks with their smaller ends downward into the path of travel of the pockets in the rotatable carrier, means operable to effect discharge of one cork at a time into each pocket as the pockets pass under the line of feed of the corks and the rotatable carrier, means to eject defective or upside down corks from the pockets, an auxiliary cork feeding means to supply corks to the pockets from which corks have been ejected, means to transfer the corks from the rotatable carrier in position over the bottles, means to feed the bottles into corking position, means for centering the bottles with relation to the corks to be inserted therein, means to center the transferring means with relation to the rotatable carrier pockets and the bottles, means whereby the extreme lower ends of the corks may be subjected to a bath to moisten and soften the lower ends only thereof prior to positioning the corks over the bottles, and means to transfer a cork from the rotatable carrier to the rotatable member of the transferring means and also eject a cork from the same and force it into the bottle centered therebeneath.

22. In a bottle corking machine, means to support a bottle in corking position, means to feed small tapered corks to a position over the bottle to be corked, means to force the cork into the bottle, and means arranged in advance of the corking position of the bottle to eject imperfect or upside down corks from the feeding means, and means to supply other corks for the ejected corks prior to the corks reaching the corking position of the bottle.

23. In a bottle corking machine, means to support a bottle, a carrier provided with cork receiving pockets, means for delivering corks to the pockets, means to eject certain corks from the pockets, means to supply corks to the pockets from which certain corks have been ejected, means to transfer a cork from the carrier and position it over the bottle, and means to eject the cork from the transferring means and force it into the bottle.

24. In a bottle corking machine, means to contain a batch of tapered corks, a chute, means to carry a number of corks from the containing means to said chute, a rotatable cork carrier provided with pockets to receive the corks, means to convey corks with their smaller ends downward from said chute to the rotatable carrier, means to deliver the corks one at a time successively to the pockets of the rotatable carrier, means to transfer the corks from the pockets of the rotatable carrier, and means to eject the corks from said transferring means and insert the corks into the bottles.

25. In a bottle corking machine, means to support a bottle in corking position, means to feed said corks to a position over the bottle to be corked, means to force the cork into the bottle, means arranged in advance of the corking position of the bottle to eject imperfect or upside down corks from the feeding means, and means to supply other corks for the ejected corks prior to the corks reaching the corking position of the bottle.

26. In a bottle corking machine, means for supporting a bottle in corking position, a cork containing means, means for feeding a cork from the cork containing means to corking position with relation to the bottle, means for subjecting one end only of the cork to a bath in its travel from the containing means to corking position, and means to insert the cork in the bottle.

27. In a bottle corking machine, means to support a bottle, means to feed a cork to corking position with relation to the bottle, an ejector means between the cork containing means and the means to support the bottle, an auxiliary cork feeding means between the cork containing means and the means to support the bottle, and means to insert the cork brought to corking position with relation to the bottle into the latter.

28. In a bottle corking machine, means to support a bottle, means to feed a cork to corking position with relation to the bottle, an ejector means between the cork containing means and the means to support the bottle, an auxiliary cork feeding means between the cork containing means and the means to support the bottle, means to insert the cork into the bottle and means to center the bottle in corking position prior to the insertion of the cork thereinto.

29. In a bottle corking machine, means to support a bottle, means to feed a cork to corking position with relation to the bottle, an ejector means between the cork containing means and the means to support the bottle, an auxiliary cork feeding means between the cork containing means and the means to support the bottle, and means to center the cork with relation to the bottle prior to insertion of the cork into the bottle.

30. In a bottle corking machine, means to support a bottle, means to feed a cork to corking position with relation to the bottle, an ejector means between the cork containing means and the means to support the bottle, an auxiliary cork feeding means between the cork containing means and the means to support the bottle, means to center the bottle with relation to the cork prior to insertion of the cork into the bottle, and means to position the cork with relation to the bottle prior to insertion of the cork into the bottle.

31. In a bottle corking machine, means to support a bottle, a cork containing means, a rotatable cork carrier, a feed tube disposed over the carrier, means between the containing means and the feed tube to right up corks and feed them to said feed tube, means to feed one cork at a time from said feed tube onto said rotatable carrier, means to take one cork at a time from said carrier and take it to corking position with relation to the bottle, and means to insert the cork into the bottle.

32. In a bottle corking machine, means for supporting a bottle, a cork containing means, a rotatable cork carrier, a feed tube arranged over the carrier, sets of belts between the containing means and the feed tube to feed the corks from the containing means to said tube, one belt of one set traveling faster than the other belt of said set and both belts of the adjacent set traveling faster than the faster one of the aforesaid set, means for discharging the corks from said feed tube onto the carrier, means to transfer the corks from the carrier to corking position with relation to the supported bottle, and means to insert such cork in the bottle.

33. In a bottle corking machine, means for supporting a bottle, a cork containing means, a rotatable carrier provided with pockets, means to feed corks from the containing means to the carrier and position the corks successively one at a time in the pockets of the carrier, means for feeding the carrier step by step, means for transferring the cork one at a time from the carrier to corking position with relation to the supported bottle, and means to insert the cork in the bottle.

34. In a bottle corking machine, means to support a bottle, means to feed the bottle into corking position, means to contain a batch of corks, a rotatable cork carrier, means to feed the corks from the containing means to a position over the carrier, means to supply one cork at a time to the carrier, means to transfer one cork at a time from the carrier to corking position with relation to the bottle, and means for inserting the cork into the bottle.

35. In a bottle corking machine, means to support a bottle, means to feed the bottle into corking position, means to contain a batch of corks, a rotatable cork carrier, means to feed the corks from the containing means to a position over the carrier, means to supply one cork at a time to the carrier, means to transfer one cork at a time from the carrier to corking position with relation to the bottle, and means for moistening and softening one end only of each cork in its travel on the carrier, and means to insert the cork into the bottle.

36. In a corking machine, means to support a bottle, a cork containing means, a rotatable cork carrier provided with cork receiving pockets, means to feed the corks from said containing means to the pockets of the carrier, means to eject corks improperly seated in said pockets, means to substitute properly seated corks for the ejected corks, means to transfer one cork at a time from the carrier to corking position with relation to the bottle, means to center the cork with relation to the bottle, and means to insert the cork into the bottle.

37. In a corking machine, means to support a bottle, cork containing means, a rotatable cork carrier provided with cork receiving pockets, means to feed the corks from said containing means to the pockets of the carrier, means to eject corks improperly seated in said pockets, means to substitute properly seated corks for the ejected corks, means to transfer one cork at a time from the carrier to corking position with relation to the bottle, and means to insert the cork into the bottle.

38. In a bottle corking machine, means for supporting a bottle in corking position, a cork containing means, means for feeding a cork from the cork containing means to a corking position with relation to the bottle, means for subjecting the cork to a bath in its travel from the containing means to corking position, and means to insert the cork into the bottle.

39. In a bottle corking machine, means to support a bottle, a rotatable cork carrier provided with a cork receiving pocket, means to deliver a cork to the pocket, means to transfer the cork from the pocket of the rotatable carrier to position over the bottle, and means to eject the cork from the transferring means and force it into the bottle.

40. In a bottle corking machine, means to support a bottle, a rotatable carrier provided with a cork receiving pocket, means to deliver a cork to the pocket, a rotatable cork transferring device operable between the rotatable carrier and the bottle to be corked, and means for simultaneously delivering a cork to the rotatable transferring device from the rotatable carrier and to eject a cork from the rotatable transferring device and force it into the bottle.

41. In a bottle corking machine, means to support a bottle, a carrier provided with cork receiving pockets, means for delivering cork receiving pockets, means to eject corks corks to the pockets, means to supply corks to from the pockets, means to supply corks to the pockets from which corks have been ejected, means to transfer a cork from the carrier and position it over the bottle, and means to force the cork from the transferring means into the bottle.

42. In a bottle corking machine, means to support a bottle, a carrier provided with cork receiving pockets, means for delivering corks to the pockets, means to eject corks from the pockets, means to supply corks to the pockets from which the corks have been ejected, means to transfer a cork from one pocket of the carrier and position it over the bottle, means to force a cork from the transferring means into the bottle, and means whereby each cork may be subjected to a bath while on the carrier.

43. In a bottle corking machine, means to support a bottle, means for feeding a cork to the bottle, means for subjecting a cork to a bath in its travel on said feeding means, and means to insert the cork into the bottle.

44. In a bottle corking machine, means to support a bottle, a rotatable carrier provided with cork receiving pockets, means for delivering corks to the pockets, said means including a tube whose lower end terminates directly over the carrier and which at its lower end has an opening therein, a cork discharging device pivotally mounted adjacent the carrier and having a projection adapted to project through the opening in the tube and into the lowermost cork in the tube to hold the corks in the tube against accidental discharge therefrom, means carried by the rotatable carrier to trip said discharging device to withdraw the cork piercing projection of the discharging device from the tube and from the lowermost cork in the tube to permit discharge of the lowermost cork from the tube to transfer the same to a pocket of the rotatable carrier, means to actuate said discharging device to return it to normal position to hold the next above cork temporarily against discharge from said tube, means to transfer a cork from the carrier and position it over the bottle, and means to force the cork from the transferring means into the bottle.

45. In a bottle corking machine, means to support a bottle, means to feed the bottle from filling position to the said supporting means, a rotatable carrier to receive corks, means for transferring corks to said carrier, means mounted between the carrier and the bottle feeding means and adapted to rotate in overlapping relation to both the bottle feeding means and the carrier to transfer a cork from the carrier to the position over the bottle, and means to force the cork from the transferring means into the bottle.

46. In a bottle corking machine, means to support a bottle, means to feed the bottle from filling position to the said supporting means, a rotatable carrier to receive corks, means for transferring corks to said carrier, means mounted between the carrier and the bottle feeding means and adapted to rotate in overlapping relation to both the bottle feeding means and the carrier to transfer a cork from the carrier to the position over the bottle, means to force the cork from the transferring means into the bottle, and means to force a cork from the carrier onto said transferring means simultaneously with the forcing of a cork from the transferring means into a bottle.

In testimony whereof I affix my signature in presence of two witnesses.

GEORGE P. MILLER.

Witnesses:
GEORGE A. KERN,
JOHN M. McGILL.